United States Patent [19]

Turner et al.

[11] 4,337,024
[45] Jun. 29, 1982

[54] SEAM ROLLER

[75] Inventors: Edward W. Turner, Deerfield; Peter J. Blake, Bondsville, both of Mass.

[73] Assignee: Hardigg Industries, Inc., Deerfield, Mass.

[21] Appl. No.: 245,978

[22] Filed: Mar. 20, 1981

[51] Int. Cl.³ .............................................. B29C 15/00
[52] U.S. Cl. .................................................. 425/363
[58] Field of Search ......................................... 425/363

[56] References Cited

U.S. PATENT DOCUMENTS 4,234,300 11/1980 Yamagisi et al. ................... 425/363

Primary Examiner—J. Howard Flint, Jr.
Attorney, Agent, or Firm—Cushman, Darby & Cushman

[57] ABSTRACT

A device for relaxing or removing tension in the side wall area adjacent and along a welded seam in thermoplastic containers.

7 Claims, 7 Drawing Figures

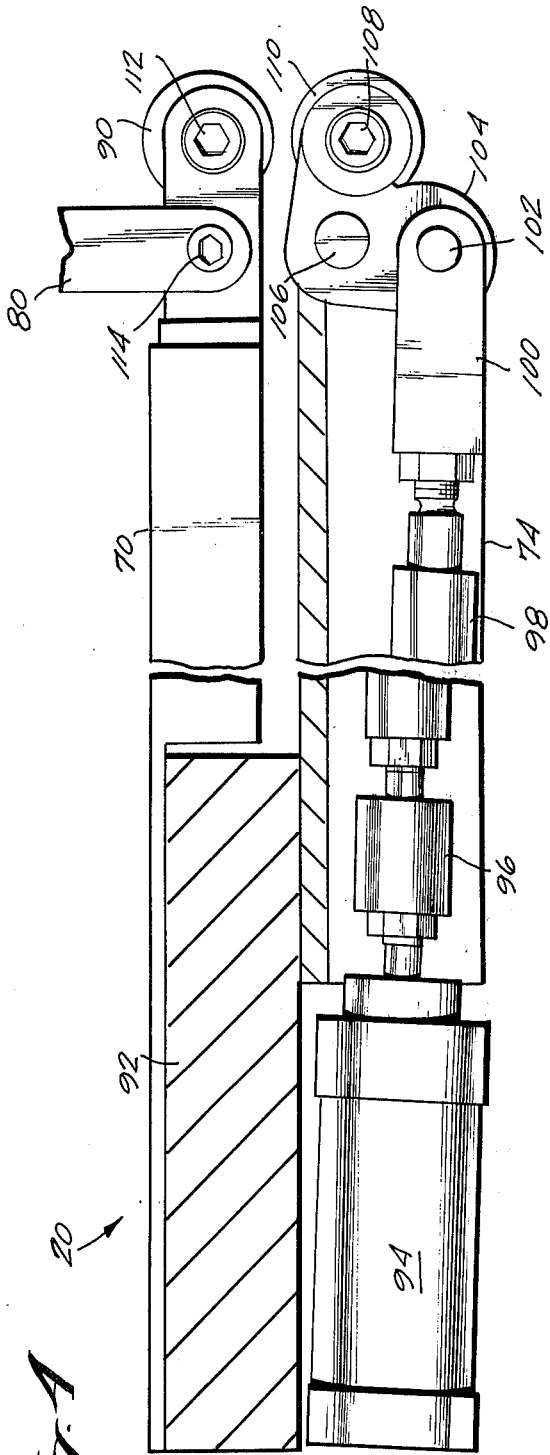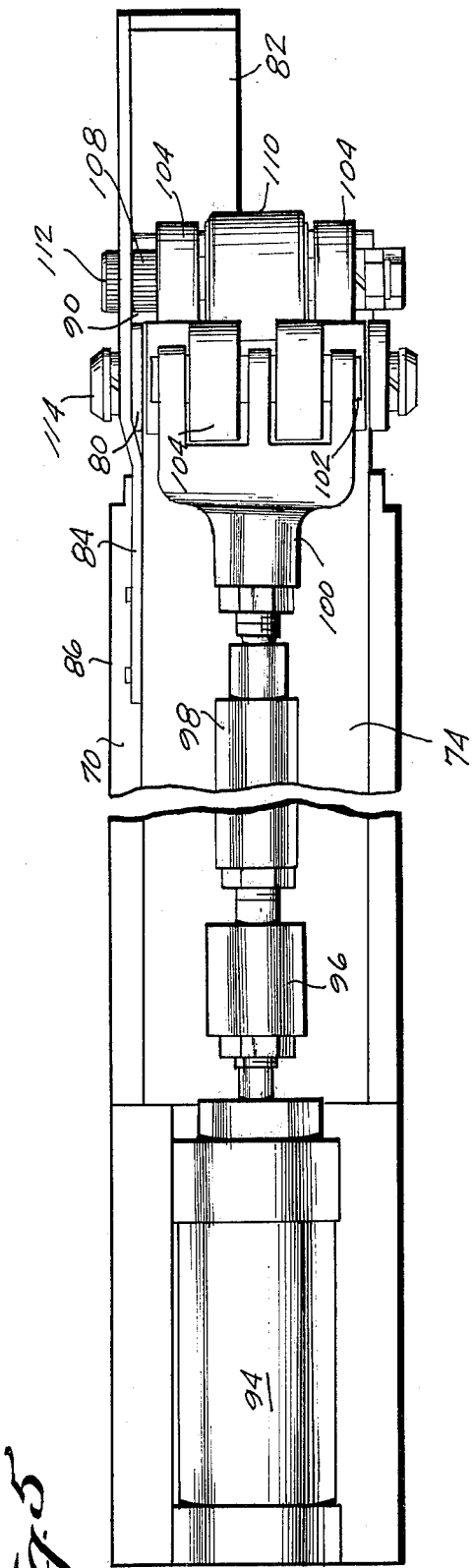

SEAM ROLLER

BACKGROUND OF THE PRESENT INVENTION

In many instances, plastic containers are prepared or manufactured by molding each half of the container and subsequently welding those two halves together. This results in a seam that extends around the container.

In the manufacture of battery jars, for use in producing acid batteries, one procedure used to mold jars is to mold half jars with each half containing three side walls and a bottom wall which are sometimes referred to as flanges. Generally, the bottom and side walls are molded so as to be longer than needed and are ultimately trimmed to a proper dimension so that the welding together of two such jar halves will produce a battery jar having the length needed to produce the desired size battery jar.

When the two halves are properly trimmed and subsequently hot-plate welded together, the opposing edges of each half are heated to the point that the edge area becomes molten. This heating results in a relatively thin band in the wall area that becomes warmed outside the immediate joint area. The wall outside of that relatively narrow band, however, remains cooler. Expansion of the plastic material induced as a result of the heating along that band will be in an outward direction, from the center of the walls thickness toward the sides thereof, tending to make that side wall thicker as well as in a lateral direction or normal to the joint. However, because of the relatively cooler area outside that narrow heated band axial expansion along the joint or in the direction of the joint will be retarded.

Following heating, the two halves are pressed together and a beaded weld joint will be formed. On cooling, shrinking will occur both laterally, with respect to the joint, and inwardly, with respect to the wall thickness. Because expansion was experienced in both of these directions, subsequent shrinking of material on cooling will substantially only return the material to its original dimensions. However, because there was initially compression occurring along the joint, caused by the fact that material was trying to expand but was being retained by the relatively cooler side wall area behind the joint, shrinkage will occur axially along the joint. This axial shrinkage along the joint produces tensile stresses in the finished joint which the side wall tends to try and correct for by bowing the wall inwardly or outwardly, depending upon the balance of other parameters about the open end or top of the completed battery jar. It can be appreciated that such bowing of walls inwardly or outwardly is undesirable from the standpoint of making it difficult to correctly fix covers to the battery jars and also where the walls bow inwardly, it is sometimes difficult to correctly insert the lead battery elements into the jar.

SUMMARY OF THE PRESENT INVENTION

We have discovered that while the weld line is still warm following the flattening of the weld bead in a subsequent heating and remolding process, such as described in a co-pending commonly assigned application U.S. Patent Application Serial No. 063,926, if that warm weld line is squeezed and rolled between rollers, especially with the rollers moving inwardly along the seam, the tensile stress is removed to the extent that the inward or outward bowing of the sidewall is greatly reduced if not eliminated.

The apparatus is comprised of two pairs of rollers with one roller in each pair being fixed, the other roller being pivotally movable with respect to the first roller. The rollers pass on opposite sides of the joint and roll both sides of the joint simultaneously. When the rolls are in contact with the jar, they are forced together and caused to traverse the length of the weld from the open end of the battery jar inwardly toward the closed end and then they are backed out again with pressure still being applied on the joint. We have found that only traversing the weld lines outwardly from within the battery jar from the closed end toward the open end would not be sufficient. However, good results are obtained if only an inward stroke is used.

Other objects, features, and characteristics of the present invention as well as the methods and operation and functions of the related elements of the structure, and to the combination of parts and economies of manufacture, will become more apparent upon consideration of the following description and the appended claims with reference to the accompanying drawings, all of which form a part of this specification, where like reference numerals designate corresponding parts in the various figures.

BRIEF DESCRIPTION OF THE DRAWINGS

FIG. 4 is a diagrammatic, top plan view of one pair of rollers, a part of which is in section;

FIG. 5 is a side, elevational view of the rollers shown in FIG. 4;

DETAILED DESCRIPTION OF THE PREFERRED EXEMPLARY EMBODIMENT OF THE PRESENT INVENTION

Figure 1:
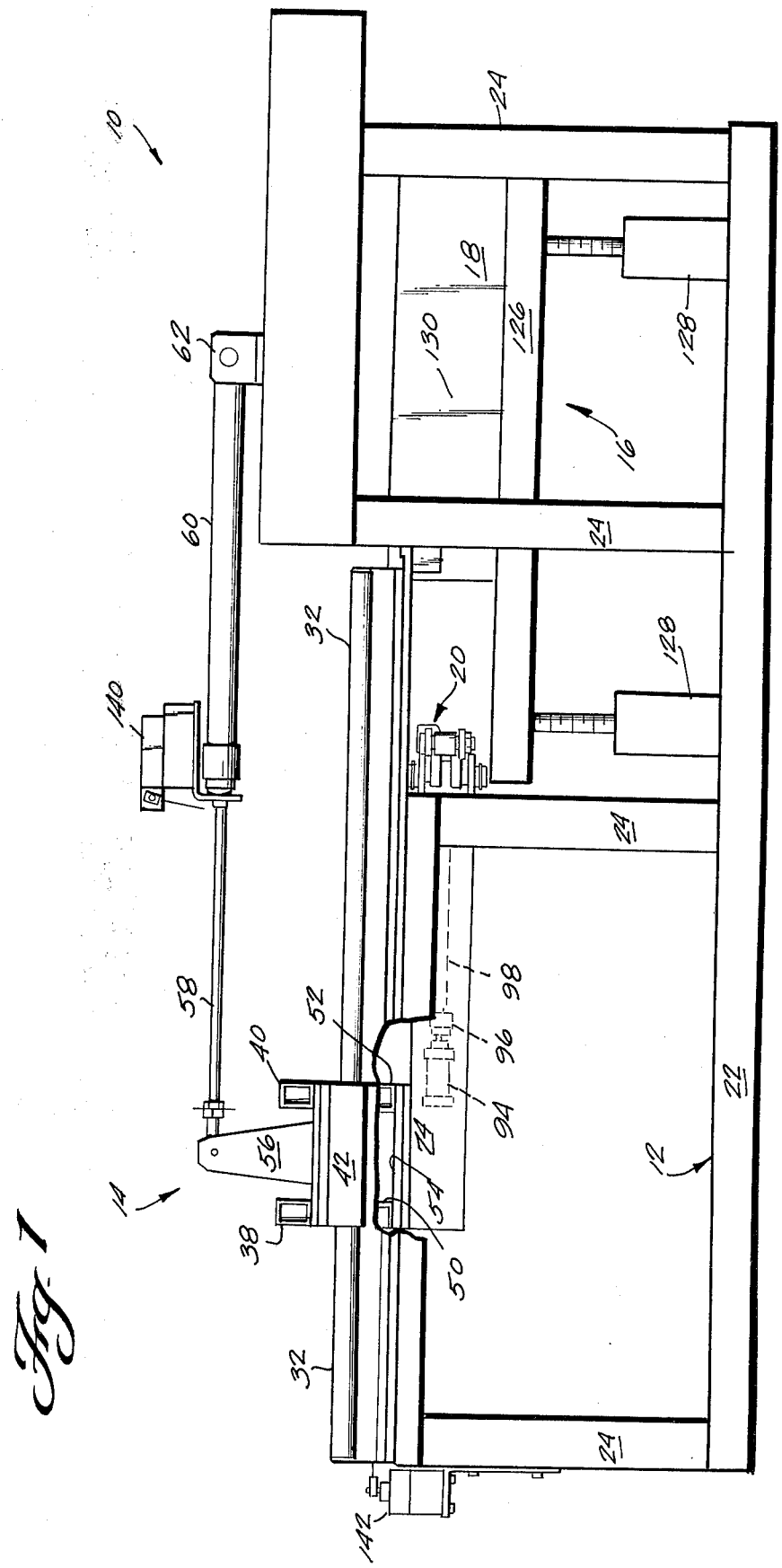
FIG. 1 is a side, elevational view of the apparatus according to the present invention.
Figure 2:
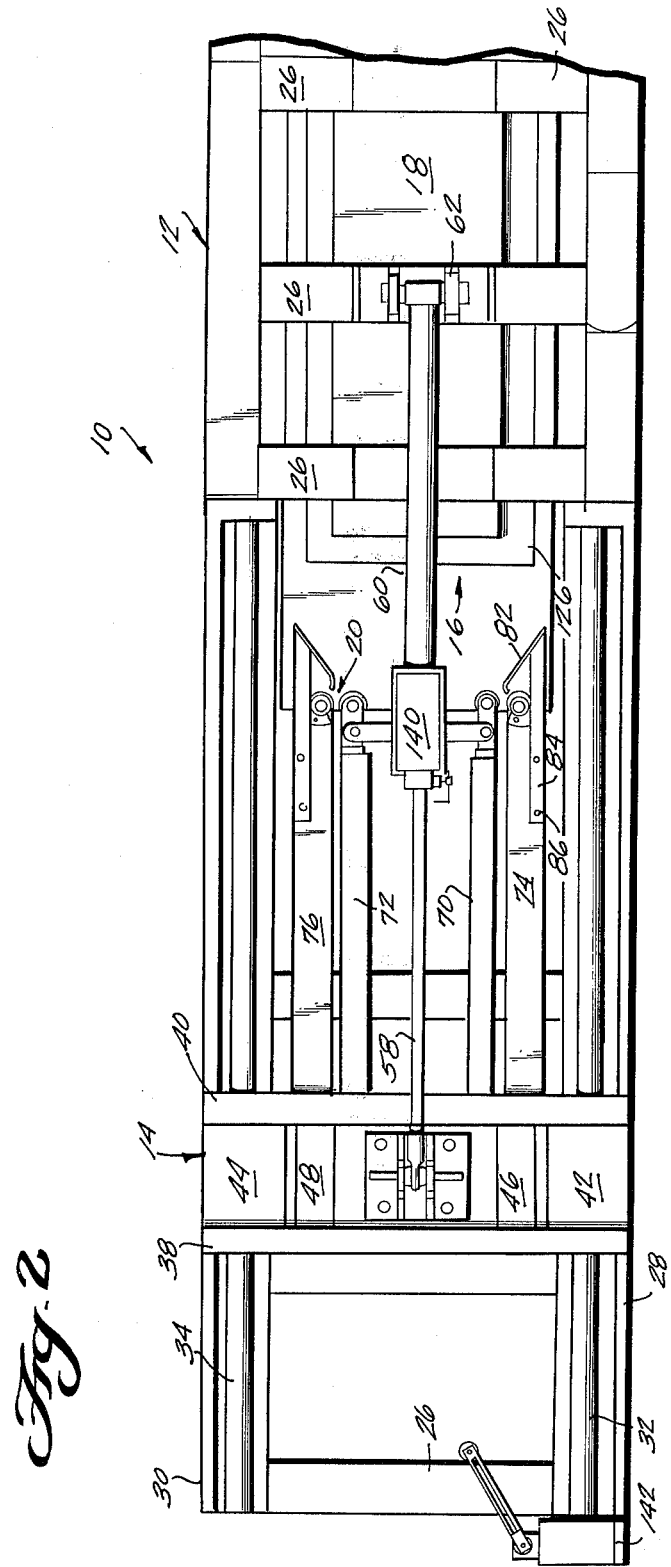
FIG. 2 is a top, plan view of the apparatus shown in FIG. 1.
Figure 3:
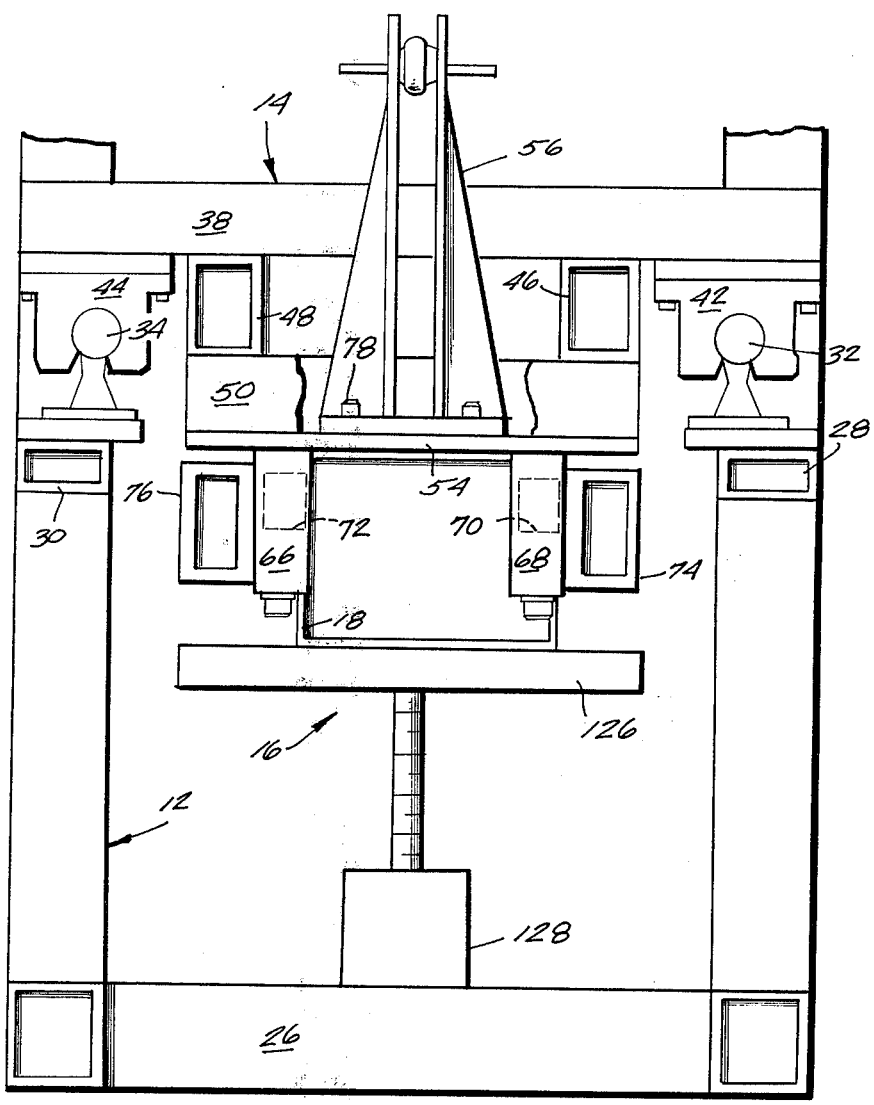
FIG. 3 is an end view of the apparatus shown in FIGS. 1 and 2.

Turning first to FIGS. 1-3, the present invention is generally indicated at 10 and is comprised of a main frame, generally indicated at 12, a carriage assembly, generally indicated at 14, and an adjustable table assembly, generally indicated at 16, for holding the battery jar 18. The roller assembly is generally indicated at 20 and is connected to and moved by carriage assembly 14.

Main frame 12 is comprised of a bottom member 22, a number of vertical members 24 and a plurality of cross members 26. Frame 12 also includes two, upper horizontal members 28 and 30, as indicated in FIG. 3, which support guide rails 32 and 34, respectively.

Carriage assembly 14 includes two top members 38 and 40 in the form of box tubes from which two slide bearings 42 and 44 depend for respectively engaging rails 32 and 34.

Connected to the underside of horizontal members 38 and 40 are a pair of square tube members 46 and 48 which extend between members 38 and 40 but inwardly of rails 32 and 34 and bearings 42 and 44. Connected beneath and extending across the ends of members 46 and 48 are two additional square tube members 50 and 52 which run in the same direction as members 38 and 40. Frame members 38 and 40, 46 and 48 and 50 and 52 are preferably welded together to form the stacked structure as shown and have dimensions suitable so that together the roller assembly 20, which is attached to this framework, will be positioned horizontally at the desired position. Secured by welding or other convenient means to the bottom of members 50 and 52 is a horizontal plate 54 which extends across members 50 and 52. Plate 54 serves as a primary support for bracket 56 which is secured to drive rod 58 of drive cylinder 60. The other end of drive cylinder 60 is secured by bracket 62 to a horizontal member 64 which extends across frame 12 as shown in FIG. 2.

Depending from horizontal plate 54 are two mounting brackets 66 and 68 on which roller assembly 20 is mounted. Specifically, roller assembly 20 is comprised of two interior cantilevered arms 70 and 72 and two outer cantilevered arms 74 and 76. These are connected to mounting brackets 66 and 68 by any convenient means such as welding or bolts. Since bracket 56 is secured to horizontal plate 54 by bolts, as indicated at 78, when cylinder 60 is actuated and drive rod 58 is pulled inwardly, bracket 56 and carriage assembly 14, including roller assembly 20, will move to the right as seen in FIG. 1.

Roller assembly 20 also includes two tie straps 80 which fix interior arms 70 and 72 together in order for those two interior arms to effectively resist bending forces that would otherwise be created on the interior arms when squeezing force was applied by the rollers at the outer ends of the outer arms. It should be kept in mind, that the width of a battery jar is the distance between the two side walls of the half jar blank whereas the length of the battery jar is equal to the dimension extending across the side of the jar containing the welded seam. The height of the battery jar is the distance from the bottom to the open end or the length along the side wall seam. The width of the jar will remain substantially constant notwithstanding the possibility of a wide variety of jar lengths. Thus, the outer dimension of the two interior arms 70 and 72 is equal to the width dimension of battery jars.

Each of the outer arms 74 and 76 contains at its front end a guide plate 82 held in place by a bracket 84 which is secured in place by screws 86. As is clear from FIG. 2, there is a gap between each set of inner and outer arms which extends the full length of those arms and it is through this gap that the jar side wall and the seam will pass. In order to assure that the side wall enters that slot, guide plate 82 is provided and will help guide the side wall into the slot lying between arms 70 and 74 on one side and between arms 72 and 76 on the other.

Turning now to FIGS. 4 and 5, a portion of arms 70 and 74 are shown and it should be noted that there is a break line running through the center of the drawings of each of the drawings. Thus, while it would appear that the gap between the two arms is shortened, only the forward and rear ends of those arms are being shown in these views.

Looking first at inner arm 70 a roller 90 is fixed in place on the outer end thereof and an internal mounting bracket 92 is located at the interior end of that arm which will lie within the carriage structure 14 shown in FIGS. 1 and 2. Arm 74 is provided with a drive cylinder 94 also located and suitably mounted internally within carriage assembly 14 which is connected by way of a flexible coupling 96 and an actuating shaft 98 to a clevis drive member 100. Clevis drive member 100 is in turn connected by means of pin 102 to rocker member 104 which is itself connected by pin 106 to the front end of arm 74. Rotatably mounted to the front of rocker member 104 by pin 108 is a roller 110. Actuating rod 98 extends along the length of actuating arm 74 and when cylinder 94 is actuated, rocker member 104 will be caused to pivot about pin 106 so that roller 110 pivots toward roller 90 at the end of interior arm 70. While the force exerted by cylinder 94 on roller 110 can vary, we prefer to employ squeezing pressures ranging from about 600 pounds to about 400 pounds when the temperature of the main seam ranges from about 100° F. to about 175° F. Thus as the seam temperature increases the amount of pressure needed is decreased.

Figure 7:
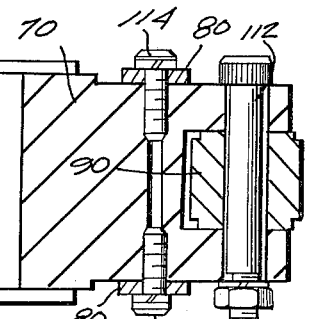
FIG. 7 is a detailed view of the fixed squeeze roller, part of which is in section for clarity.

Turning to FIG. 7, a partial, sectional view of the front end of arm 70 is shown with roller 90 being fixed in place by pin 112 while tie straps 80 are held in place by means of pins 114.

Figure 6:
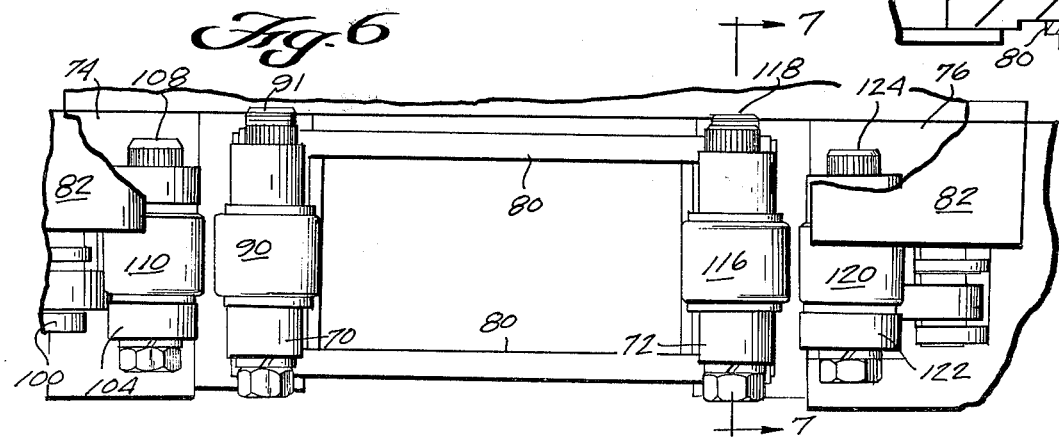
FIG. 6 is a front, elevational view of the roller assembly.

With reference to FIG. 6, the front ends of each of the cantilevered arms 70, 74, 72 and 76 are shown. The front of arm 72 is provided with a roller 116 rotatably mounted therein by the pin 118 while the front end of arm 76 is provided with a roller 120 rotatably mounted within a rocker member 122 by pin 124.

In order to correctly position and support the container or battery jar 18 an adjustable assembly 16 comprised of table 126 is positioned inwardly of the vertical members 24 at the opposite end of frame 12 from where carriage assembly 14 is positioned, as is shown in FIG. 1. Table 126 rests on and is vertically adjusted by screw jacks 128 which are mounted to frame 12. Thus, to correctly position the seam, indicated at 130 in FIG. 1, at a vertically centered position with respect to the rollers at the ends of the cantilevered arms table 126 can be adjusted upwardly or downwardly by jacks 128. The bottom of jar 18 will rest against cross members 26 and vertical members 24 at the end of the device and will hold the jar in position as carriage assembly 14 moves toward that end in its inward stroke. If it is desired to apply pressure on the outward stroke as well, clamps (not shown) could also be employed, which would be mounted to table 126 and clamp the jar from its top surface, to grip the bottom end of the jar and hold it firmly in place on table 126.

While drive cylinder 60 is preferably a hydraulic cylinder and supplied with hydraulic fluid by a pump (not shown), its operation can be controlled manually by means of a two position lever that would move carriage 14 forward in its drive stroke when in one position and rearwardly out of the container in its rearward stroke when the lever was in its second position. Likewise, cylinders 94 for driving rocker members 104 and 122 could also be manually operable so as to grip the welding seam area with the lever in one position and to open as shown in FIG. 4 in the second position.

Alternatively, limit switch 140 could be provided on top of cylinder 60 as shown in FIG. 1 in order to sense when carriage assembly 14 was in its forward full stroke position and a second limit switch 142 could be provided on the rear of main frame 12 in order to sense when carriage assembly 14 had returned to its full back position.

We prefer to employ a spring return cylinder for cylinder 94 and another limit switch (not shown) could be employed together with actuating rod 98 in order to sense when rollers 110 and 120 were pivoted into their engaging position with the side wall of the battery jar.

Inputs from these various limit switches could be fed to known control circuitry such as is employed with a Texas Instruments model 5 programmable controller and sequencer in order to control the automatic operation of this seam roller apparatus.

While the invention has been described in connection with what is presently considered to be the most practical and preferred embodiment, it is to be understood that the invention is not to be limited to the disclosed embodiment but on the contrary, is intended to cover various modifications and equivalent arrangements included within the spirit and scope of the appended claims, which scope is to be accorded the broadest interpretation so as to encompass all such modifications and equivalent structures.

What we claim is:

1. Apparatus for relieving tensile stress along welded seams in plastic containers comprised of means for holding the container so that at least one seam therein is at a predetermined position, movable roller means including at least two rollers respectively engaging the inner and outer sides of the seam and for applying rolling pressure thereto, and drive means for moving said at least two rollers along a predetermined portion of the seam and for establishing the rolling pressure.

2. Apparatus as in claim 1 wherein the roller means includes carriage means for movably supporting said roller means, two pairs of spaced apart cantilevered arms, one of the arms in each pair being an inner arm while the other is spaced outwardly from the inner arm.

3. Apparatus as in claim 2 wherein the two inner arms in each pair are rigidly connected together.

4. Apparatus as in claim 3 wherein rollers are rotatably mounted at the outer end of each of the arms.

5. Apparatus as in claim 4 wherein the rollers at the outer ends of said outer arms are mounted so as to be pivotally movable toward and away from the rollers at the outer end of the inner arms.

6. Apparatus as in claim 5 wherein guide means are mounted so as to extend forwardly of the outer end of the outer arms so that the side wall of the container will be guided into the space defined between the rollers at the outer ends of each pair of arms.

7. Apparatus for relieving tension along welded seams in plastic containers comprising roller means for engaging both sides of the welded seam and drive means for moving said roller means along at least a predetermined length of said welded seam.

* * * * *